(12) United States Patent
Hsiao et al.

(10) Patent No.: US 6,438,582 B1
(45) Date of Patent: Aug. 20, 2002

(54) METHOD AND SYSTEM FOR EFFICIENTLY COORDINATING COMMIT PROCESSING IN A PARALLEL OR DISTRIBUTED DATABASE SYSTEM

(75) Inventors: Hui-I Hsiao, Saratoga; Amy Chang, San Jose, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/120,379

(22) Filed: Jul. 21, 1998

(51) Int. Cl.[7] .............................................. G06F 15/16
(52) U.S. Cl. ...................... 709/206; 709/201; 709/202; 709/205; 709/220; 707/8; 707/10; 707/201; 707/202
(58) Field of Search ................................ 709/202, 101, 709/205, 200–201, 204–206, 213–216, 220–221, 223, 236–237, 248; 707/7–10, 201–204

(56) References Cited

U.S. PATENT DOCUMENTS

| 5,202,971 A | * | 4/1993 | Henson et al. .................. 707/8 |
| 5,291,594 A | * | 3/1994 | Sekiguchi et al. ........... 707/201 |
| 5,390,302 A | * | 2/1995 | Johnson et al. .............. 709/230 |
| 5,546,582 A | * | 8/1996 | Brockmeyer et al. ....... 709/201 |
| 5,557,748 A | * | 9/1996 | Norris ......................... 709/220 |
| 5,799,305 A | * | 8/1998 | Bortvedt et al. ............... 707/10 |
| 5,872,969 A | * | 2/1999 | Copeland et al. ........... 709/101 |
| 5,884,327 A | * | 3/1999 | Cotner et al. ................ 707/202 |
| 5,958,004 A | * | 9/1999 | Helland et al. ............. 709/101 |
| 5,999,712 A | * | 12/1999 | Moiin et al. ................. 709/220 |
| 6,085,295 A | * | 7/2000 | Ekanadham et al. ........ 709/214 |
| 6,247,023 B1 | * | 6/2001 | Haiao et al. ................. 707/202 |

* cited by examiner

*Primary Examiner*—Bharat Barot
(74) *Attorney, Agent, or Firm*—Wayne L. Ellenbogen; Anne Vachon Dougherty

(57) ABSTRACT

A method and system wherein participant node lists are maintained for each individual transaction. In addition, local nodes maintain participant node lists and provide same to coordinating nodes under certain circumstances. The coordinating nodes merge participant node lists and selectively utilize the lists to minimize message duplication. Further, connection node lists for each application are maintained at coordinating nodes and are utilized for application rollback procedures.

19 Claims, 5 Drawing Sheets

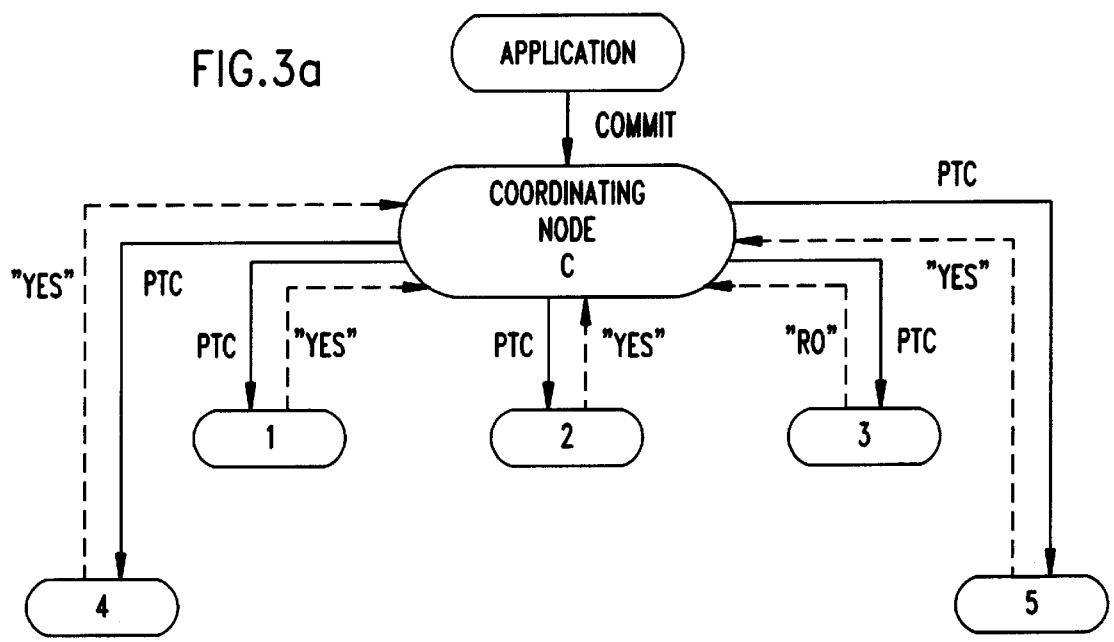
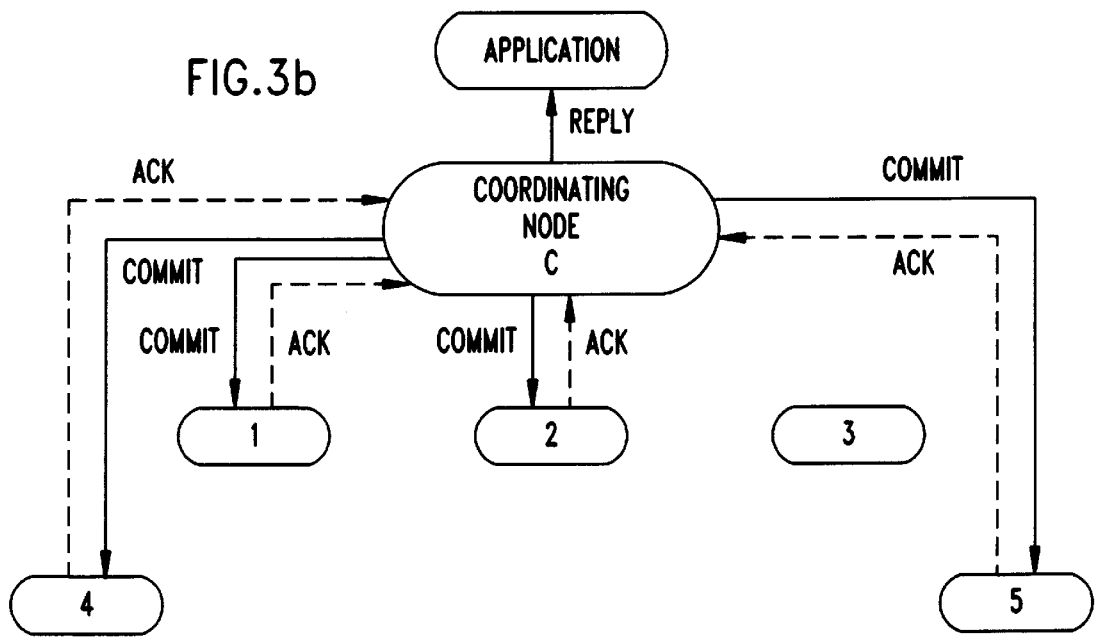

METHOD AND SYSTEM FOR EFFICIENTLY COORDINATING COMMIT PROCESSING IN A PARALLEL OR DISTRIBUTED DATABASE SYSTEM

FIELD OF THE INVENTION

This invention relates to parallel or distributed data processing systems and more particularly to a mechanism which avoids duplication of messages when processing transaction commit and rollback procedures.

BACKGROUND OF THE INVENTION

In a multi-node environment, a transaction which has been started on an originating, or coordinating, node will be sent to associated remote nodes, referred to as participant nodes. After the transaction has started at the coordinating node, C, a remote node, R, will be added to the coordinating node's participant node list when a request is sent to node R on behalf of the transaction. Standard procedure on a coordinating node is to maintain one participant list, which is continually updated as needed. Since more than one transaction may be executing in sequence, and less than all of the nodes on the system may be participating in each transaction, communications regarding a given transaction which are sent to all nodes on the participant list may arrive at nodes which are not participating in the transaction. Furthermore, on behalf of the same transaction, the remote participant node R may send a request on to another remote node, N. Node N is then added to a transaction participant list at node R. It is possible, however, that the coordinating node C does not have any awareness of node N. Therefore, should node C need to communicate information, such as a transaction rollback request, to all nodes which have participated in the transaction, node C will only have sufficient information for contacting those nodes in the node C participant node list. In the prior art, node C would provide the rollback request to node R, and node R would then be responsible for passing the rollback request on to any nodes, N, which are on its participant list for the transaction, as illustrated in FIG. 1. FIG. 1 shows that any given "subordinate" node, such as node 4 which has transaction ties to nodes 1, 2 and 5, could receive a given message generated at the coordinating node three times (one each from nodes 1, 2 and 5).

In the alternative, participant node R could provide its participant list to coordinating node C in response to a message, with node C then resending the message to all participant nodes. In such as scenario, each of nodes 1, 2 and 5, could receive the message two times, while node 4 could receive the message six times. The sending of redundant messages results in unnecessary bandwidth consumption and unnecessary duplication of message processing at both the coordinating node and the remote participant nodes.

It is therefore an objective of the present invention to provide a mechanism by which, in parallel or distributed processing systems, transaction information can be most efficiently communicated to relevant nodes.

SUMMARY OF THE INVENTION

This and other objectives are realized by the present invention wherein participant node lists are maintained for each individual transaction. In addition, local nodes maintain transaction participant node lists and provide same to the transaction coordinating nodes under certain circumstances. The coordinating nodes merge transaction participant node lists and selectively utilize the lists to minimize message duplication. Further, connection node lists for each application are maintained at coordinating nodes and are utilized for application rollback procedures.

BRIEF DESCRIPTION OF THE DRAWINGS

The invention will now be detailed with specific reference to the appended drawings wherein:

FIGS. 3a and 3b illustrate commit processing when one participant node votes read only while all others vote to commit in accordance with the present invention.

DESCRIPTION OF THE PREFERRED EMBODIMENT

Figure 1:
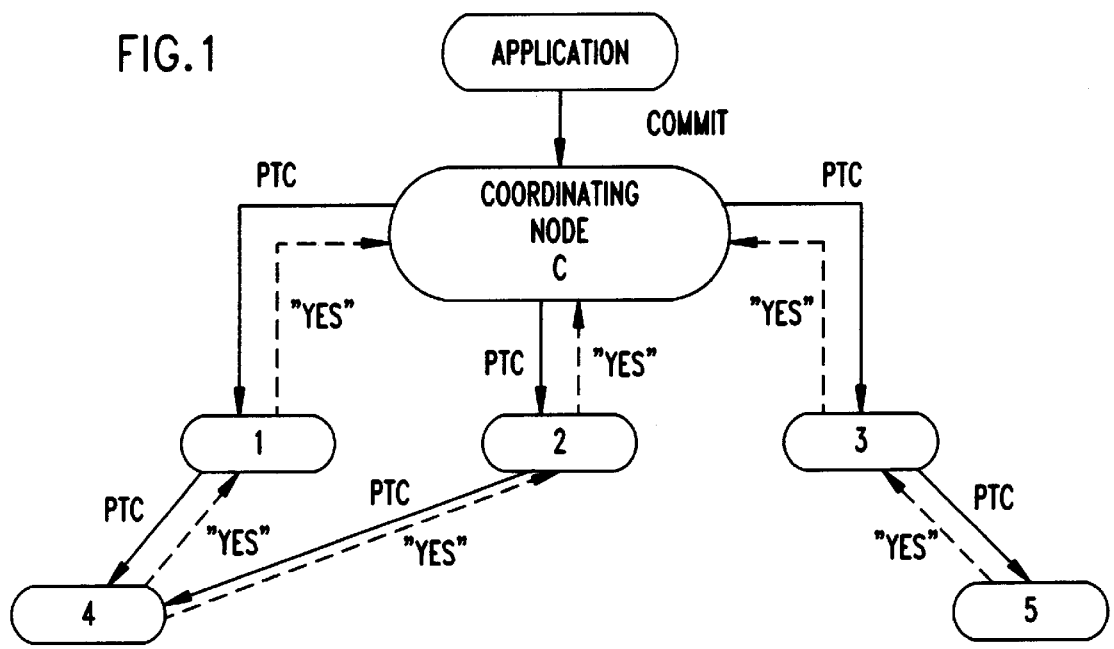
FIG. 1 illustrates a prior art process flow for transaction operations conducted by a coordinating node of a parallel or a distributed transaction processing system.

Since more than one transaction may be executed in sequence, and each transaction may involve only a subset of the nodes configured on the system, it is preferable that a participant node list be maintained for each transaction, which list identifies the subset of nodes which are participating in the current transaction. When the transaction commits, or is rolled back, only the nodes in the participant node list for the current transaction need to be informed of the transaction outcome and need to take part in the processing of that outcome. In addition, if a participant node must invoke the assistance of another node for transaction processing, that participant node will maintain its own transaction participant list, which will be provided to the coordinating node under certain circumstances, as further discussed below.

A coordinating node will also maintain a connection node list comprising the union of all the participant node lists for an application. The connection node list will be used to identify all of the nodes with which an application (and not simply a single transaction) has had contact. If the application terminates or a special transaction rollback is issued, all nodes on the connection node list will be contacted.

A further aspect of the invention provides that a list of the participant nodes will be stored in a node's log files along with the commit or abort record for the completed transaction at each participating node as well as at the coordinating node. In that way, if the database has to be restarted due to problems which occurred in the middle of the transaction processing, the log information can be used to resend the transaction outcome to the proper subset of nodes on the system.

A detailed description of transaction processing involving the aforementioned lists will now be detailed with reference to FIGS. 2a through 5b. After a transaction has started on node C, and as soon as a request is sent to a remote node R on behalf of the transaction, that remote node is added to the transaction's participant node list maintained at node C. At node R, if a request is sent to a remote node, N, on behalf of the transaction, node N is placed on a transaction participant node list which is maintained at node R. It is to be noted that, while there may be multiple agents at any given node which are concurrently working on behalf of the same transaction, only one agent per transaction per node is in charge of the commit processing. That agent (hereinafter referred to as the "local node agent") is responsible for ensuring that notification has been sent to other agents working on the same transaction at the same node, such that no new database update is done on behalf of the transaction after commit processing commences. In addition, under certain circumstances, the local node agent for a participant node will additionally be responsible for providing the local transaction participant node list to the coordinating node for a transaction.

Figure 2A:
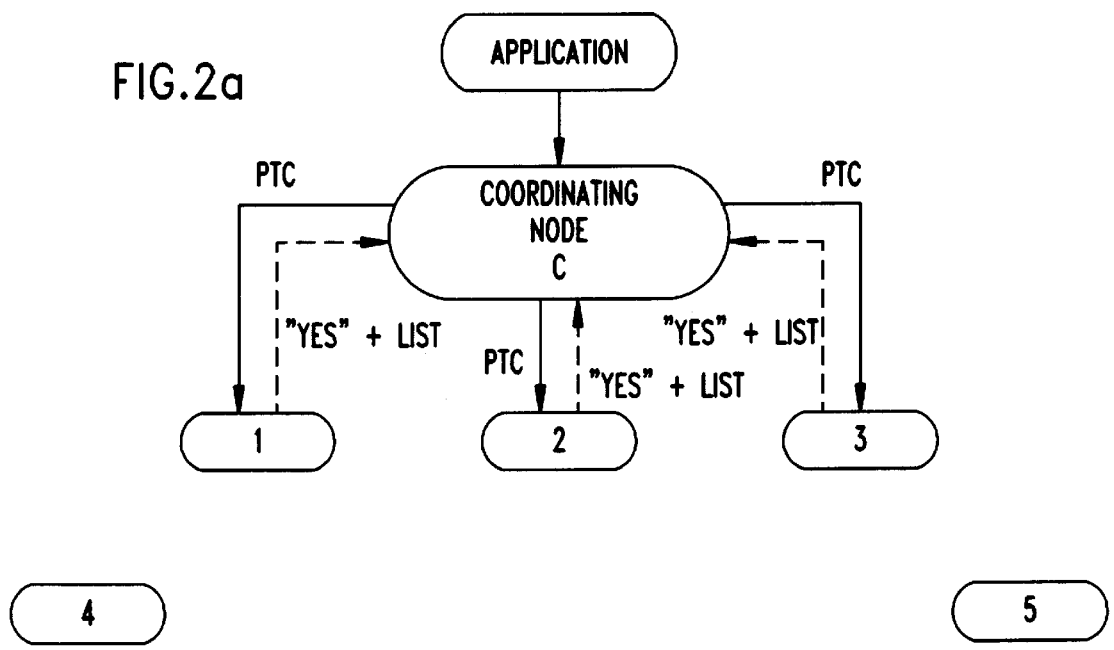
FIGS. 2a through 2c illustrate commit processing when all participant nodes vote to commit in accordance with the present invention.
Figure 2B:
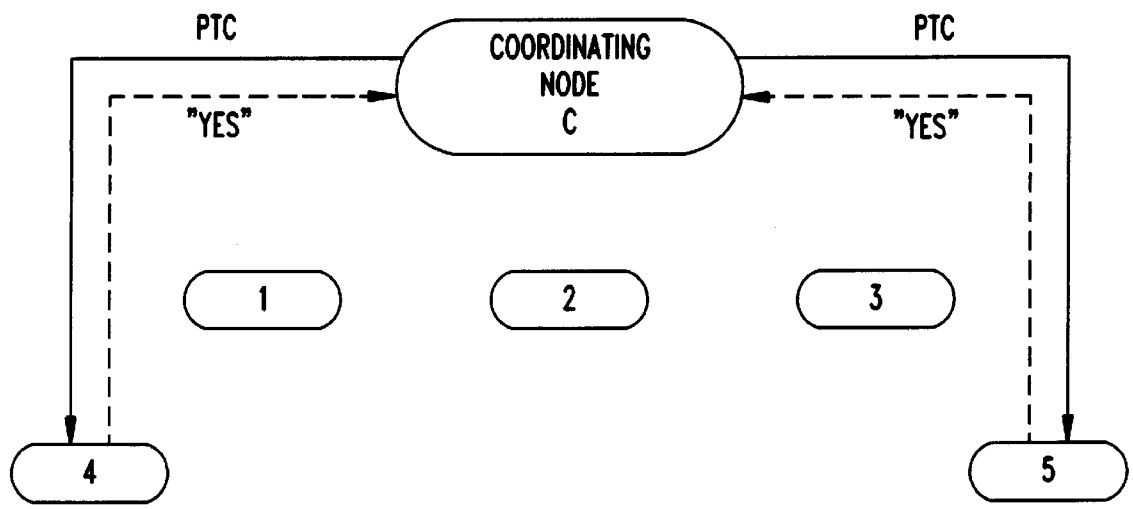
Figure 2C:
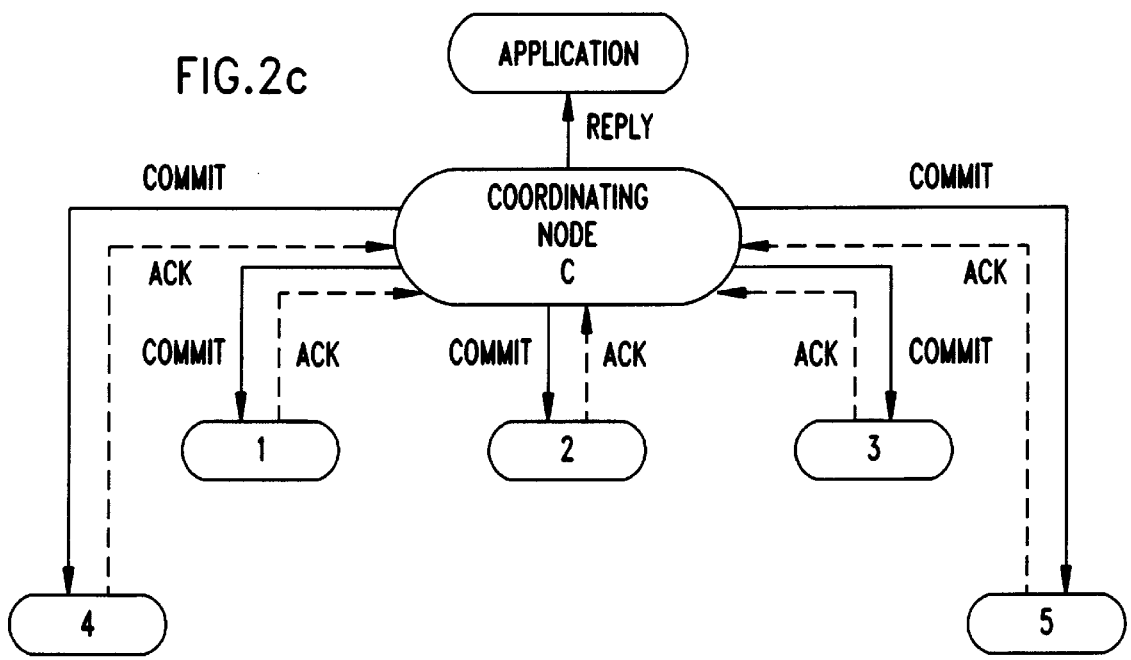

For a commit request which has been received by an application, as illustrated in FIGS. 2a through 2c, the local node agent for a coordinating node will send out a "prepare to commit" request to all nodes recorded in that transaction's participant node list. As illustrated, nodes 1–3 receive the request, since the coordinating node is not yet aware of the participation of nodes 4 and 5. At each remote node R (1–3) which is on the list and receives the request, a parallel local node agent will be selected to serve the "prepare to commit" request. If the local transaction state is "ready to commit," the local node agent will force a prepare log to disk and then send a reply message (in this case, "yes") to the coordinating node. The local transaction participant node list maintained at each participant node will be piggybacked onto the reply message which is being sent to the coordinating node. In the illustrated case, node 1 responds "yes" and provides its list which includes node 4; node 2 responds "yes" and provides its list which also includes node 4; and node 3 responds "yes" and provides its list which includes node 5.

At the coordinating node, all transaction participant node lists received from participant nodes will be merged, thereby creating an updated transaction participant node list for the transaction. Since it is necessary for the coordinating node to obtain unanimous consent of all participant nodes prior to committing a transaction, and the coordinating node has become aware of additional participant nodes for the current transaction, another "prepare to commit" message must be sent. The coordinating node will send the subsequent "prepare to commit" message to only those nodes which have been added to the updated transaction participant node list for the transaction. In that way, duplicate requests will not be processed by the nodes from the original participant node list, which had already received the first "prepare to commit" request. As illustrated, the coordinating node then becomes aware of the participation of nodes 4 and 5, merges its participant node lists and subsequently sends the "prepare to commit" request only to those newly-added nodes, 4 and 5, as shown in FIG. 2b. The procedure (of the coordinating node sending the requests; receiving replies along with local participant node lists; merging participant node lists; and sending subsequent requests to newly-added participants) repeats itself until all nodes participating in the current transaction have sent back their replies to the "prepare to commit" message(s). In this way, the coordinating node can be assured that all necessary participant nodes have been contacted without need, or the inconvenience, of duplicating message transmission, receipt and processing. Since all of the participant nodes have responded "yes" to the "prepare to commit" request, FIG. 2c illustrates all participant nodes, 1–5, receiving the "commit" outcome message, and acknowledging same.

As an optimization, a node can vote "read only" if a transaction did not update the database state at that node, as described with reference to FIGS. 3a and 3b. Assuming, for this description, that coordinating node C is aware of all of the relevant participant nodes, a "prepare to commit" message is sent to nodes 1–5 from coordinating node C. In response, Node 3 responded with a "read only" message, while nodes 1, 2, 4 and 5 voted "yes." After voting "read only," the participant node can proceed to release all resources held on behalf of the transaction and forget about the transaction. Similarly, when the coordinating agent receives a "read only" vote from a node, the coordinator will not send the subsequent commit or abort message to the node, as shown in FIG. 3b wherein the commit message is sent only to nodes 1, 2, 4 and 5. If all participant nodes voted "read only," the transaction would be regarded as a local transaction and no more messages would be sent out to the participants.

If at least one participant node voted "yes" and no nodes voted "no," the transaction is to be committed. The coordinating node first performs commit processing locally, which includes writing a commit log record, including the most-recently updated participant node list for the transaction and a list of those participant nodes that voted "yes" to the "prepare to commit" request. Thereafter, the coordinating node sends a commit message to all participant nodes that answered "yes" at the "prepare to commit" phase and waits for commit acknowledgements from those nodes.

Upon receipt of the commit message at a participant node, the local node agent selected to perform commit processing locally writes a commit log record to signal the end of the transaction at the participant node and then sends a commit acknowledgement back to the coordinating node. Once all commit acknowledgements have been received, the coordinating node writes a forget log record, after which the transaction state can be "forgotten" at the coordinating node.

Figure 4A:
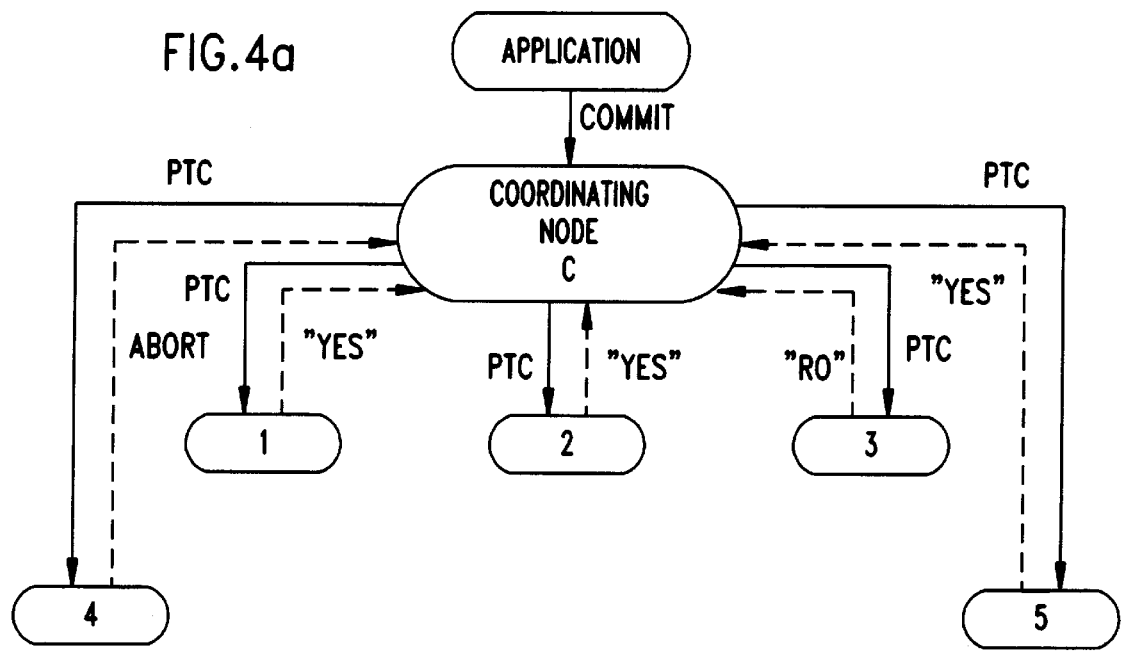
FIGS. 4a and 4b illustrate one implementation of abort processing in accordance with the present invention.
Figure 4B:
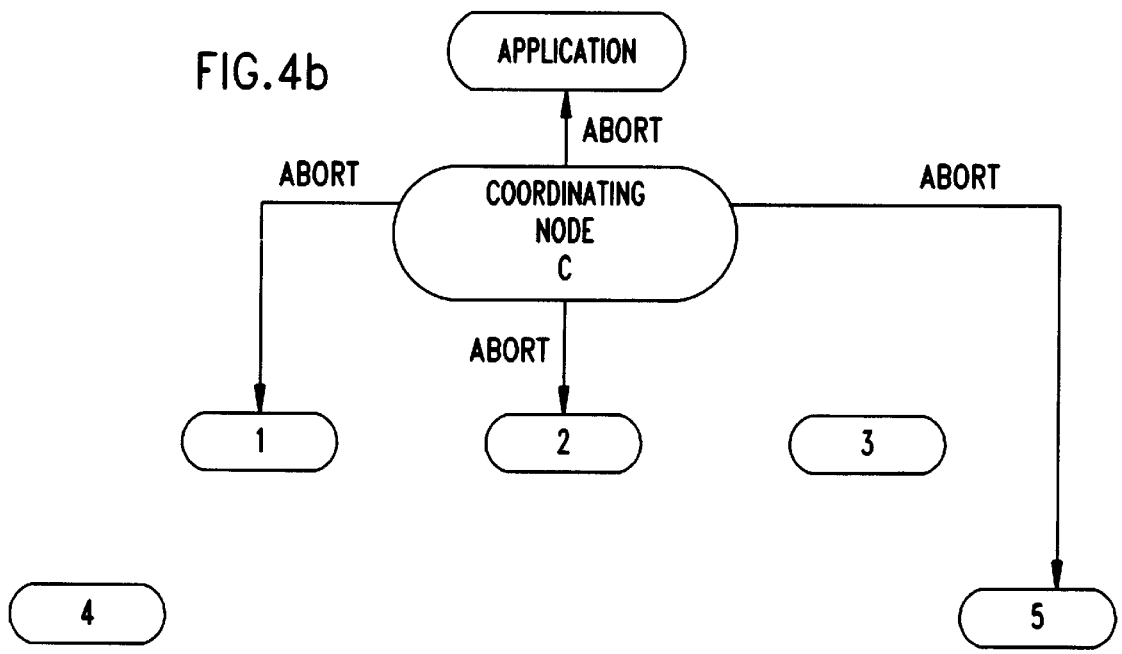

If any node voted "no" in response to the "prepare to commit" request, the transaction is to be aborted, as shown in FIGS. 4a and 4b. On normal transactions, the coordinating node sends the vote outcome to all nodes that answered "yes" to the "prepare to commit" request. As will be apparent, those nodes which answered "no" or "read only" do not require responses since they have already indicated that the outcome will not affect them. Therefore, as shown in FIG. 4a, node 4 voted "no" and node 3 voted "read only", which results in the coordinating node sending "abort" messages to only nodes 1, 2 and 5, as shown in FIG. 4b. Upon receiving the vote outcome, each participant node will select an agent to service the request by locally aborting the transaction. No acknowledgement is needed in the case of an abort outcome.

Figure 5A:
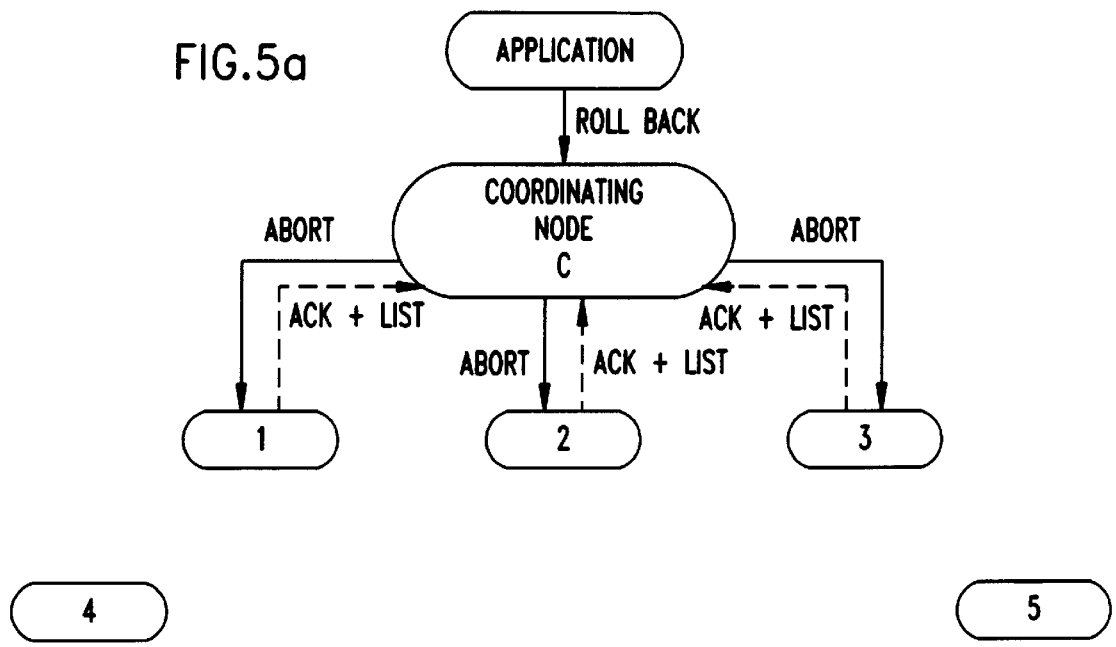
FIGS. 5a and 5b illustrate transaction rollback processing in accordance with the present invention.
Figure 5B:
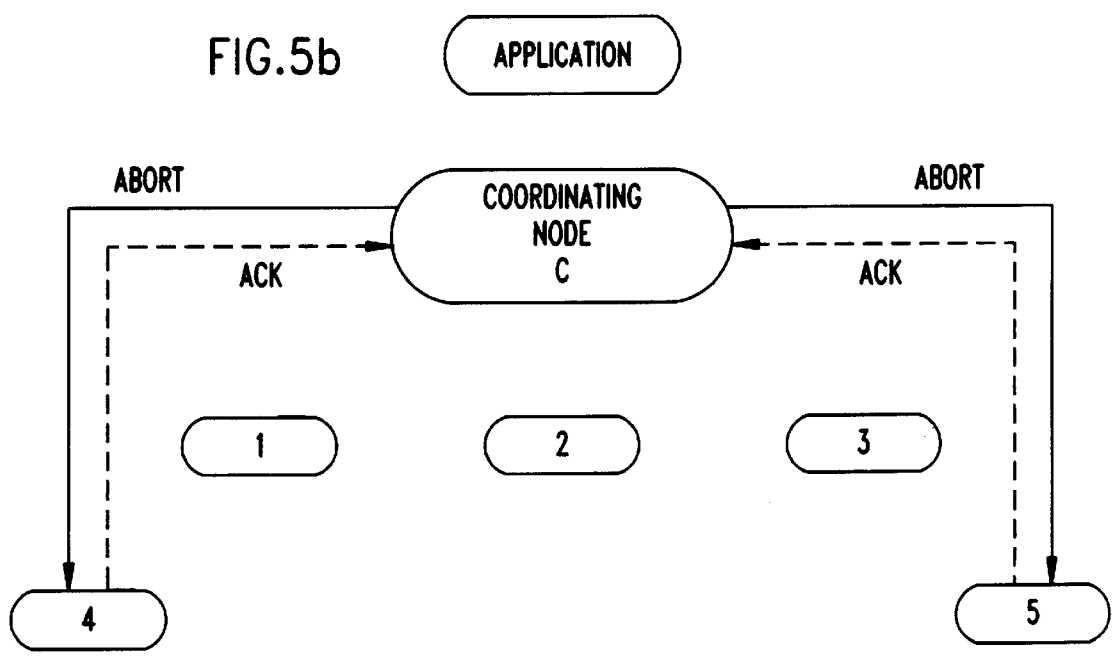

If the application invokes a transaction rollback request, the transaction is to be aborted. The coordinating node will send an abort message to all nodes on its participant node list, as shown in FIG. 5a. Upon receiving the abort message at the participant node, each participant node will select an agent to service the request. In the case of a rollback request, the agent at the participant node will send an acknowledgement along with its own participant list to the coordinating node. In the illustrated embodiment node 1 acknowledges and provides its list which includes node 4; node 2 acknowledges and provides its list which also includes node 4; and node 3 acknowledge and provides its list which includes node 5. As above, the acknowledgement step is necessary since the coordinating node may not yet be aware of the nodes on the local participant node list for the transaction. Thereafter, the participant node lists are merged at the coordinating node and the rollback request sent to the newly-added nodes, 4 and 5, as shown in FIG. 5b.

On special transactions, where some cursors may remain open across transaction boundaries, the cursors will need to be closed in the case wherein the transaction is to be aborted. Since the coordinating node's current participant node list may not be complete, and may not include all nodes which have opened cursors, the aforementioned connection node list will be used. Every node which has participated in any transaction of an application will be provided with the transaction abort message. In addition, the coordinating node will await receipt of additional participant node lists in response to the abort message, update its lists, send the message to newly-added participant nodes, etc. until all nodes involved in the application have been notified.

Finally, if a transaction is to be rolled back due to a major system error, such as a remote node failure, then the abort message will be sent to all nodes on the system. The reason behind this action is that the coordinating node may not have the participant node list from the node that failed. Therefore, to ensure that all relevant participant nodes are informed of the transaction abort message, and that no nodes are left holding the transaction open, all nodes in the system are notified.

The invention has been described with reference to several specific embodiments. One having skill in the relevant art will recognize that modifications may be made without departing from the spirit and scope of the invention as set forth in the appended claims.

Having thus described our invention, what we claim as new and desire to secure by Letters Patent is:

1. A method for a coordinating node to execute transactions in a multi-node system comprising the steps of:
   maintaining a transaction participant node list for all nodes participating both directly with said coordinating node and indirectly in each of said transactions; and
   communicating with only those nodes on said transaction participant node list for a given one of said transactions.

2. The method of claim 1 further comprising the step of maintaining a connection node list for all nodes participating in an application said connections node list comprising a merged list comprising the union of all the participant node lists for an application.

3. The method of claim 2 further comprising the step of communicating with all nodes on said connection node list to abort a transaction.

4. A coordinating node system for executing transactions in a multi-node system comprising:
   means for creating and maintaining transaction participant node list for all nodes participating both directly with said coordinating node and indirectly in each of said transactions; and
   communication means for communicating with only those nodes on said transaction participant node list for a given one of said transactions.

5. The system of claim 4 further comprising:
   means for receiving at least one response from at least one node participating in a transaction, said response including at least an additional transaction participant list of nodes with which said participating node communicated on behalf of said transaction; and
   merging means for merging said additional transaction participant list with said transaction participant list.

6. The system of claim 5 wherein said communication means comprises means for sending communications to only those nodes merged from said additional transaction participant list.

7. A method for a node to participate in transactions originating at a coordinating node in a multi-node system comprising the steps of:
   creating and maintaining a transaction participant node list for all nodes participating with said node for each of said transactions; and
   communicating said transaction participant node list for a given one of said transactions in response to a transaction request from said coordinating node.

8. A node system for participating in transactions originating at a coordinating node in a multi-node system comprising:
   means for maintaining a transaction participant list for all nodes participating with said node for each of said transactions; and
   communication means for communicating said transaction participant node list for a given one of said transactions in response to a transaction request from said coordinating node.

9. A method for a participant node to respond to a transaction request from a coordinating node, said participant node creating and maintaining a transaction participant node list of all nodes participating in transactions with that participant node, comprising the steps of:
   receiving a transaction request from said coordinating node;
   preparing a response message including a response to said request and said transaction participant node list; and
   sending said response message to said coordinating node.

10. A method for a coordinating node to execute a transaction in a multi-node system comprising the steps of:
    (a) issuing a first request to at least one participating node in said system;
    (b) storing the identity of said at least one participating node on a first transaction participant node list;
    (c) receiving a response message to said request from said at least one participating node, said response message including a response and at least one additional transaction participant node list; and
    (d) storing said at least one additional transaction node list.

11. The method of claim 10 further comprising the step of:
    (e) merging said first and said at least one additional transaction participant node lists to produce an updated transaction participant list.

12. The method of claim 11 further comprising the steps of:
    (f) identifying at least one node on said updated transaction participant list which had not been on said first transaction participant list;
    (g) issuing a successive request to said at least one identified node;
    (h) repeating steps (c) through (g) until no further nodes have been identified; and
    (i) finalizing said transaction based on said responses.

13. The method of claim 12 wherein said finalizing comprises notifying participating nodes on said updated transaction participant list of the outcome of said request.

14. The method of claim 13 wherein said request comprises a "prepare to commit" message.

15. The method of claim 14 wherein at least one of said participating node responses comprises a "no" response and wherein said finalizing comprises notifying participating nodes on said updated transaction participant list to abort said transaction.

16. The method of claim 14 wherein at least one of said participating node responses comprises a "no" response and wherein said finalizing comprises notifying all but said at least one of said participating nodes to abort said transaction.

17. The method of claim 14 wherein all of said participating node responses comprises "yes" responses and wherein said finalizing comprises notifying participating nodes on said updated transaction participant list to commit said transaction.

18. The method of claim 10 wherein a system error has occurred and wherein said issuing a first request comprises sending an abort message to all nodes on said system.

19. The method of claim 12 wherein said request comprises a "prepare to commit" message and at least one of said participating node responses comprises a "read only" response, wherein said finalizing comprises notifying all but said at least one of said participating nodes to commit said transaction.

* * * * *